United States Patent Office 3,440,207
Patented Apr. 22, 1969

3,440,207
MIXED ORGANOSILOXANE POLYMERS WITH
ESTERIFIED SILICA FILLER
Siegfried Nitzsche, Manfred Wick, and Ernst Wohlfarth, Burghausen, Bavaria, Germany, assignors to Wacker-Chemie G.m.b.H., Munich, Germany
No Drawing. Filed June 5, 1963, Ser. No. 285,572
Claims priority, application Germany, June 14, 1962, W 32,425
Int. Cl. C08g 47/06, 47/10
U.S. Cl. 260—37         1 Claim This invention relates to a novel composition curable at room temperature to form an elastomer and based upon organosiloxane polymers.

Elastomeric materials based on organosiloxane polymers are well known articles of industry. An extremely important segment of the commercial development of such elastomers is the room temperature vulcanizing (RTV) silicone rubbers presently employed as sealants, molding materials, caulking materials, dental impression materials and in a host of other uses.

The presently marketed RTV silicone rubber compounds can generally be classified as (1) those compounds marketed as two-package or two-component systems which must be admixed just prior to use and then must be used quickly because vulcanization begins at the moment the ingredients are admixed, and (2) those compounds which are marketed as single package systems and vulcanize when exposed to atmospheric moisture without further mixing. The single package or one-component system typically contains a hydroxylated diorganosiloxane polymer admixed with an alkyltriacyloxy silane. Such mixtures cure in the presence of atmospheric moisture, hence must be carefully prepared and packaged to exclude even trace amounts of water. Even the fillers employed in such systems must be specially dried prior to addition to the mixtures because the presence of moisture will initiate the cure of the mixture in storage. Furthermore, the vulcanization and cure mechanism of the described one-component system produces relatively large proportions of the carboxylic acid corresponding to the acyloxy groups in the silane employed (e.g. when methyltriacetoxy silane is employed, 3 mols of acetic acid may be produced from each mol of silane present). Of course, the acid has a corrosive effect on the surrounding materials and may have an objectionable odor as well.

It is an object of this invention to introduce a novel room temperature vulcanizing silicon rubber. A further object is to introduce a one-component silicone rubber stock capable of vulcanizing and curing under the influence of atmospheric moisture in a practical length of time at temperatures at least as low as 10° C. A room temperature vlucanizing silicone rubber stock which adheres firmly to a wide variety of materials without corrosive effect during curing is also sought. A new material useful in organic solvent solutions as a release coating on paper is also sought. A novel silicone elastomer stock capable of curing at room temperature under the influence of moisture and offering economic advantage in that the ingredients are readily available and relatively inexpensive and avoiding the heretofore noted difficulties is also an object of this invention. Other objects and advantages of this invention are detailed in or will be apparent from the disclosure and claims following.

This invention consists of a mixture of [I] 0.5 to 15 parts by weight of a silicon compound containing at least 3 silicon-bonded radicals of the formula —OR wherein each R is a monovalent hydrocarbon radical, halogenohydrocarbon radical, hydrocarbonoxyhydrocarbyl radical or halogenohydrocarbonoxyhydrocarbyl radical, and [II] 100 parts by weight of an essentially diorganosiloxane polymer of the general formula R''COO(R₂SiO)ₙOCR'' wherein each R' is a monovalent hydrocarbon, halogenohydrocarbon or cyanoalkyl radical, each R'' is a hydrogen atom, or a monovalent hydrocarbon or halogenohydrocarbon radical and n has an average value of at least 5.

The ingrednent [I] employed herein is a silicon compound containing at least 3 —OR groups bonded to silicon in each molecule. Operable under this definition are (a) silanes of the formula R'ₘSi(OR)₄₋ₘ where R and R' are as above defined and m is 0 or 1, (b) partial hydrolyzates of such silanes, (c) siloxanes having a viscosity of less than 120,000 cs. at 25° C. of the general unit formula

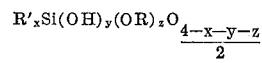

where R and R' are as above defined and x, y and z are each 0, 1, 2 or 3, x+y+z does not exceed 3 and x has an average value of from 1 to 1.7 inclusive with at least 3 —OR groups per molecule, (d) mixtures of any one or more of (a), (b) and (c) and (e) a silica filler having surface OR groups introduced via esterification with an alcohol.

The silanes [I] (a) are orthosilicates of the formula Si(OR)₄ and silanes of the formula R'Si(OR)₃ wherein each R' is a monovalent hydrocarbon, halogenohydrocarbon, or cyanoalkyl radical and each R is a monovalent hydrocarbon, halogenohydrocarbon, hydrocarbonoxyhydrocarbyl or halogenohydrocarbonoxyhydrocarbyl radical. The radicals represented by R' can be illustrated by alkyl radicals such as methyl, ethyl, isopropyl, tert.-butyl, dodecyl, octadecyl and myricyl radicals; alkenyl radicals such as vinyl, allyl and hexenyl radicals; cycloalkyl radicals such as cyclobutyl, cyclopentyl and cyclohexyl radicals; cycloalkenyl radicals such as cyclopentenyl, cyclohexenyl and cyclooctenyl radicals; aryl radicals such as phenyl, xenyl, naphthyl and phenanthryl radicals; aralkyl radicals such as benzyl and beta-phenylethyl radicals; aralkyl radicals such as toluyl, xylyl and ethylphenyl radicals; halogeno derivatives of the foregoing radicals such as chloromethyl, pentafluorobutyl, trifluorovinyl, o, p, and m-chlorophenyl, 3,3,3-trifluoropropyl, bromophenyl, α,α,α-trifluorotolyl, bromoxenyl, chlorotrifluorocyclobutyl, chlorocyclohexyl, o, p, and m-iodophenyl; as well as cyanoalkyl radicals such as beta-cyanoethyl, gamma-cyanopropyl, omega-cyanobutyl, gamma-cyanobutyl, beta-cyanopropyl and omega-cyanooctadecyl radicals. When cyanoalkyl radicals are present, it is preferred that they be bonded to at least one mol percent of the silicon atoms present. Preferably, at least 50 mol percent of the radicals represented by R' are aliphatic radicals of less than 5 carbon atoms, particularly methyl radicals, and the remaining R' radicals are phenyl radicals. Accordingly, methyl, ethyl, propyl, butyl, vinyl, allyl, methallyl, butenyl and phenyl radicals as well as halogenated and cyanolated derivatives thereof are preferred.

The radicals represented by R can be illustrated by any and all of the alkyl, alkenyl, cycloalkyl, cycloalkenyl, aryl, aralkyl, and alkaryl radicals and the halogeno derivatives of such radicals set forth in the discussion of R' above. In addition, each R can be a hydrocarbonoxyhydrocarbyl or halogenohydrocarbonoxyhydrocarbyl radical of the formula R'''(OCH₂CH₂)ₐ where each R''' is a monovalent hydrocarbon or halogenohydrocarbon radical such as the alkyl, alkenyl, cycloalkyl, cycloalkenyl, aryl, aralkyl and alkaryl radicals and halogen derivatives thereof described for R' above and a is 1, 2 or 3. Examples of these latter radicals include,

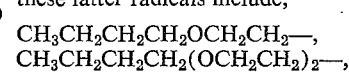

CH₂=CHCH₂OCH₂CH₂—,
CH₃CH₂OCH₂CH₂—,
CH₃CH₂(OCH₂CH₂)₂—,
CH₃CH₂(OCH₂CH₂)₃—,
CH₃OCH₂CH₂O—,
C₆H₅OCH₂CH₂—,
ClCH₂CH₂OCH₂CH₂—, and
CF₃OCH₂CH₂—

Preferably, the unsubstituted hydrocarbon and halogenohydrocarbon radicals represented by R contain less than 7 carbon atoms and the R''' radicals contain less than 5 carbon atoms.

In the silanes, silicates, partial hydrolyzates and siloxanes set forth above as ingredient [I] herein, the various groups represented by R, R' and R''' can be the same or different individually and collectively. Accordingly, illustrations of materials operable as the OR containing ingredient [I] herein include (a) ethylorthosilicate, n-propylorthosilicate, amylorthosilicate, allylorthosilicate, pentenyl - 2 - orthosilicate, diethyldipropylorthosilicate, n-hexylorthosilicate, methylpolysilicate, ethylpolysilicate, isopropylpolysilicate, sec.-amylpolysilicate, n-butylpolysilicate, Si(OCH₂CH₂OCH₃)₄,
CH₃Si(OCH₂CH₂OCH₃)₃,
O[Si(OCH₂CH₂OCH₃)₃]₂,
Si(OCH₂CH₂OC₂H₅)₄,
Si(OCH₂CH₂OCH=CH₂)₄,
Si(OCH₂CH₂OCH₂CH₂CH₂CH₃)₄,
C₆H₅Si(OCH₂CH₂OCH₃)₃,
CH₂=C(CH₃)CH₂Si(OCH₂CH₂CH₂OCH₃)₃,
C₅H₉Si(OCH₂CH₂OCH₃)₃,
CF₃CH₂CH₂Si(OCH₂CH₂OCH₃)₃,
ClC₆H₄Si(OCH₂CH₂OCH₃)₃,
CH₃Si(OCH₃)₃
CH₃Si(OC₂H₅)₃ and
C₂H₅Si(OCH₃)₃, (b) partial hydrolyzates of the silanes and silicates listed and (c) mixtures of the silanes, silicates and/or their partal hydrolyzates. It is preferred to employ orthosilicates and their partial hydrolyzates (i.e. $m=0$) and it is further preferred to employ materials where R' contains less than 7 carbon atoms.

In addition to the silanes, orthosilicates, and partial hydrolyzates described above, ingredient I can be (c) an organosiloxane polymer of units of the general formula $$R'_xSi(OH)_y(OR)_zO_{\frac{4-x-y-z}{2}}$$

where each R and each R' are as above defined and $x$, $y$ and $z$ are 0, 1, 2 or 3, $x+y+z$ is not greater than 3, $x$ has an average value from 1.0 to 1.7 inclusive and each molecule has at least 3 OR groups present. Examples of these siloxanes I (c) are copolymers of about 80 mol percent CH₃SiO₃/₂ units and 20 mol percent (CH₃)₂SiO units containing 8 percent by weight Si-bonded ethoxy groups and 6 percent by weight Si-bonded hydroxy groups. These siloxanes can be prepared by known methods, for example, reacting the corresponding halogenosilanes with alcohols of the formula ROH in proportions such that only a portion of a halogen atoms on silicon are reacted and then the remaining halogen atoms are converted to OH groups through a hydrolysis reaction which may be accompanied by condensation to produce the siloxanes.

The silicon compound having OR groups can also be (e) a silica filler esterified with an alcohol of the formula ROH where R is as above defined. Preparation of such esterified silica fillers is well known and is described, for example, in U.S. Patents Nos. 2,657,149, issued Oct. 27, 1953; 2,680,696, issued Jan. 8, 1954; 2,727,876, issued Dec. 20, 1955; 2,736,668, issued Feb. 28, 1956; 2,736,669, issued Feb. 28, 1956; 2,739,074, issued Mar. 20, 1956; and 2,739,075, issued Mar. 20, 1956. The desired silicas for use as ingredient I (e) can be prepared, for example, by heating finely divided silica having a surface of 1–900 square meters per gram with an alcohol of the formula ROH at a temperature above 100° C. in the presence of a strong acid or base. The resulting silica generally contains at least 100 OR groups per 100 millimicron². A commercially available operable silica filler, for example, consists of at least 88 weight percent silica and up to 12 weight percent butoxy groups.

The organosiloxane polymers which are ingredient II herein are essentially linear homopolymers and copolymers of the general formula R''COO(R'₂SiO)ₙOCR''. The preferred polymers have a viscosity of at least 5,000 cs. at 25° C. and range up to high polymeric gums of 5×10⁶ cs. viscosity at 25° C. Particularly useful results are achieved with polymers in the viscosity range from 20,000 cs. to 100,000 cs. at 25° C. Homopolymers, copolymers or mixtures can be used. In the formula, $n$ should have an average value of at least 5 and R' is as above defined.

The operable polymers II are endblocked with acyl radicals of the formula

where R'' is an aliphatic hydrocarbon radical of less than 19 carbon atoms, preferably free of aliphatic unsaturation. Examples of

are the formyl, acetyl, propionyl, butyryl, isovaleroyl, hexoyl, 2-ethylhexoyl, n-octanoyl, stearoyl, benzoyl and p-tolylcarboxy radicals.

The siloxane polymers II are essentially linear, hence contain at least 95 mol percent of R'₂SiO units but SiO₄/₂ units, R'SiO₃/₂ units, and R'₃SiO₁/₂ units can be present in limited quantities. In other words, branching along the polymeric chain can be present but it is preferred that the branching be terminated with non-functional groups such as R'₃SiO₁/₂ units. Throughout the polymeric molecule the average ratio of R' to Si should not be lower than 1.95 to 1 and the more nearly the ratio approaches 2 to 1 the better the products will be. In each polymer molecule the radicals represented by R' can be the same as in a dimethylsiloxane polymer or they can be different as in a trifluoropropylmethylsiloxane polymer or in a copolymer of dimethylsiloxane units, diphenylsiloxane units and methylvinylsiloxane units. It is, however, preferred that at least 50 mol percent of the R' groups be methyl radicals hence the methyl to silicon ratio for the polymer should be at least 1/1.

The organosiloxane ployers II can be prepared by any desired method. One suitable method consists of reacting a hydroxyl endblocked essentially diorganosiloxane of the formula HO(R'₂SiO)ₙH with a monocarboxylic acid (R''COOH), a halide of such acid (R''COCl), an anhydride of such acids [(R''CO)₂O] or with a compound of the formula (R''COO)₂SiR'₂ where R' and R'' are as above defined. Alternatively, a chlorine endblocked siloxane polymer of the formula Cl(R'₂SiO)ₙSiR'₂Cl can be reacted with at least an equivalent of monocarboxylic acid of the formula R''CCOH to produce the desired polymer.

The ingredients I and II defined above are essentially water free and are combined by any desired method. The preferred mixtures contain 100 parts by weight of the organosiloxane polymer II and 0.5 to 15 parts, preferably 1.5 to 6 parts, by weight of I the silicon compound containing OR groups.

It is preferred to employ a catalytic quantity of a condensation catalyst in the silicone rubber stocks of this invention. Any of the catalysts known for use in room temperature vulcanizing silicone rubber stocks can be employed. A partial listing of such catalysts follows.

Particularly useful are primary, secondary and tertiary organic and silyl organic amines with a basic dissociation constant of at least $10^{-7}$ in dilute aqueous solution at 25° C.; carboxylic acids with an acid dissociation constant of at least $10^{-7}$ in dilute aqueous solution at 25° C., carboxylic acid salts and phosphoric acid salts of ammonia, amines, quaternary ammonium hydroxides, and of certain metals, particularly those from lead to manganese in the electromotive series of metals, including those metals containing hydrocarbon radicals bonded to the metals and their acid esters, as well as titanium esters such as tetra-n-butyl-titanate and their partial hydrolyzates.

Examples of amines suitable for condensation catalysts are sec.-butylamine,
diethylbenzylamine,
diethylamine,
diisoamylamine,
di-n-butylamine,
diisobutylamine,
dimethylamine,
dimethylaminomethylphenol,
dimethylbenzylamine,
dipropylamine,
ethylamine,
ethylenediamine,
hydrazine,
isoamylamine,
isobutylamine,
isopropylamine,
methane diamine,
methylamine,
methyldiethylamine,
tert.-octylamine,
tert.-nonylamine,
piperidine,
n-propylamine,
tert.-octadecylamine,
quinine,
tetramethylenediamine,
tetramethylguanidine,
triethylamine,
triisobutylamine,
trimethylamine,
trimethylenediamine,
tripropylamine,
L-arginine,
L-lysin,
aconitine,
benzylamine,
cinchonidine,
codeine,
conine,
emetine,
ethanolamine,
o-methoxybenzylamine,
m-methoxybenzylamine,
p-methoxybenzylamine,
N,N-methoxybenzylamine,
o-methylbenzylamine,
m-methylbenzylamine,
p-methylbenzylamine,
N,N-methylbenzylamine,
morphine,
nicotine,
p-aminobenzoic acid diethylaminoethylester,
ε-phenylamylamine,
δ-phenylbutylamine,
β-phenylethylamine,
β-phenylethylmethylamine,
γ-phenylpropylamine,
N,N-isopropylbenzylamine,
physostigmine,
piperazine,
chinidine,
solanine,
sparteine,
thebaine,
tert.-butyl-2,4-dinitro-phenylamine,
tert.-butyl-2-hydroxy-5-nitro-benzylamine,
tert.-butyl-4-isonitrosoamylamine,
tert.-octylamylamine,
tert.-octyl-2-(beta-butoxyethoxy)ethylamine,
morpholine,
ethanolamine,
diethylaminoethanol,
methyldiethanolamine, and
2,4,6-tris(dimethylamino)phenol.

Condensation products of aliphatic aldehydes and aliphatic primary amines, for example, those of formaldehyde and methylamine, acetaldehyde, and allylamine, crotonaldehyde and ethylamine, isobutyraldehyde and ethylamine, acrolein and butylamine, alpha,beta-dimethyl acrolein and amylamine, butyraldehyde and butylamine, acrolein and allylamine, formaldehyde and heptylamine are also suitable. The amino hydrocarbons are preferred, i.e., organic compounds which contain only N atoms in addition to the C and H atoms. Furthermore, it is expedient to use those amino compounds which are relatively non-volatile at room temperature.

Suitable condensation catalysts are also amino organosilicon compounds such as disiloxanes of the formula $O[Si(CH_3)_2(CH_2)_nNH_2]_2$ described in U.S. Patent No. 2,557,803 or silanes of the formula

and

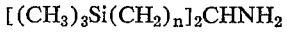

described in U.S. Patent 2,662,909.

Suitable carboxylic acid condensation catalysts are abietic acid, acetic acid, cyanoacetic acid, phenoxyacetic acid, acrylic acid, beta-benzoylacrylic acid, angelic acid, anisic acid, N-acetylanthranilic acid, arachic acid, atropic acid, benzoic acid, o-bromobenzoic acid, p-cyanobenzoic acid, 2,6-dichlorobenzoic acid, 2,5-dinitrobenzoic acid, m-fluorobenzoic acid, brassidic acid, dl-campholic acid, capric acid, cinnamic acid, cyclohexanecarboxylic acid, cyclopropane carboxylic acid, formic acid, 3-furan carboxylic acid, trimethylsilylacetic acid, 5-nitro-2-furonic acid, 10-hendecenic acid, isobutyric acid, lauric acid, levulinic acid, lignocerinic acid, linoleic acid, oleic acid, stearic acid, tetrahydropyromucic acid, 3-ethylpentanoic acid, p-aminobenzoic acid, and 2,4-xylonic acid as well as polycarboxylic acid such as oxalic acid, adipic acid, azelaic acid, o-carboxymethoxybenzoic acid, 1-camphor acid, 1,2-cyclobutanedicarboxylic acid, symm.-bis-beta-carboxymethyltetramethyldisiloxane, 1,2,3,4,5,6 - cyclohexanehexacarboxylic acid, 1,2 - cyclopentanedicarboxylic acid, diphenic acid, ethylmalonic acid, pimelic acid, sebacic acid, succinic acid, citric acid and 1-decene-1,10-dicarboxylic acid.

Examples of suitable ammonia or amine salt condensation catalysts are those of the formula:

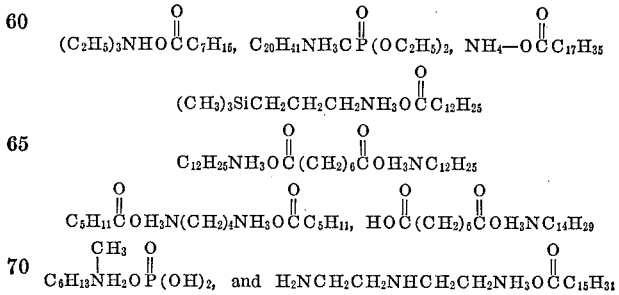

as well as di-2-ethylhexylaminoacetate,
triphenylsilpropylaminoformate, trimethylsiloxydimethylsilhexylaminohexoate,
4,4-diaminobenzophenonbutyrate,
4,4-diaminodiphenylether-decanoate,
tri-n-butylaminoacrylate,
3,4-dichloroanilincaproate,
anilinoctoate,
didodecylamino-o-chlorophenoxyacetate,
ethylamine-3-ethoxypropionate,
diethylenetriaminemonooleate,
diisopropylaminopalmitate,
trimethylaminostearate,
benzylhydrazinhexoate,
2,5-dimethylpiperazineoctoate,
di(octadecylamine)sebacate,
ethylenediaminedihexoate,
tetraethylenepentaminediphosphate,
1,2-aminopropanephenylphosphate, and ammonium stearate as well as any other salts of the other above amines and acids. These enumerations are by no means exhaustive, they are merely examples for some types of amine salts which can be employed.

Examples of quaternary ammonium hydroxide salts which can be used as condensation catalysts are tetramethylammonium - 2-ethylhexoate, benzyltrimethylammonium acetate and phenyltrimethylammonium-2-ethylhexoate.

Examples of metal salts from the electromotive series from lead to manganese which are useful as condensation catalysts—namely, lead, tin, nickel, cobalt, iron, cadmium, chromium, zinc, and manganese as well as zirconium, antimony, barium, calcium, titanium and bismuth are the naphthenates of the metals named such as lead-, cobalt, and zinc naphthenates, salts with fatty acids such as iron-2-ethylhexoate, lead-2-ethylhexoate, dibutyltindilaurate and chromium octoate, salts with aromatic carboxylic acids such as dibutyltindibenzoate, salts with polycarboxylic acids such as dibutyltinadipate, lead sebacate, and salts with hydroxy carboxylic acids such as dibutyltindilactate. Such metal salts are fully disclosed in U.S. Patents Nos. 2,843,555 and 2,927,907 as well as in U.S. patent application Ser. No. 602,081, filed Aug. 3, 1956.

The primary amines and metal salts are preferred as condensation catalysts. The condensation catalyst is employed in amount of from 0.01 to 10 parts by weight, preferably 0.1 to 5 parts by weight based on the presence of 100 parts by weight diorganopolysiloxanes of the general formula R″COO(R′$_2$SiO)$_n$OCR″.

The components of the masses of the present discovery can be mixed with each other in any desired order.

The additives common to organopolysiloxane elastomers, viz., those for improving permanent deformation, pigments, soluble dyes, aromatics, oxidation inhibitors, heat stabilizers, flame inhibitors, light stabilizers as well as reinforcing and non-reinforcing fillers can also be used at the same time.

Examples of reinforcing fillers are silicas obtained pyrogenically in the gas phase, silica hydrogels dehydrated while retaining the structure, i.e., the so-called aerogels, and precipitated silicas with a large surface. These fillers can have organosilyl groups at the surface if desired. Non-reinforcing fillers are viz., calcium carbonate, the coarser silicas such as diatomaceous earth and quartz flour, metal powder such as aluminum or nickel powder or metal oxides such as titanium dioxide, ferric oxide, aluminum oxide, and zinc oxide. Also the common fibrous fillers for organopolysiloxane elastomers such as asbestos and glass fibers can be used. Non-reinforcing fillers are preferred. Preferably the fillers are used in quantities of 5 to 150, preferably 10–85 parts by weight calculated on 100 parts by weight of organopolysiloxane.

The masses of the present discovery can be dissolved or dispersed in inert solvents. Operable solvents are free of Si bonded acyloxy groups and do not react with RO groups, for example, hydrocarbons such as benzene, toluene, xylene, or petroleum ether, halogen hydrocarbons such as perchloroethylene or chlorobenzene, ethers, such as diethylether and dibutylether, ketones such as methyl-isobutylketone and fluid organopolysiloxanes which are free from Si bonded hydroxyl groups and acyloxy groups.

In the method of the present discovery, all of the above mixture components for the masses hardenable to elastomers can be used without special drying, that is, in their commercial air-dry form without affecting the shelf life of the materials which naturally must be stored carefully avoiding exposure to water.

It is expedient to store the materials in tubes. Other containers with closure devices can also be used for storage, preferably of not more than 50 kg. volume. Metal containers used for storage are preferably lined with polyethylene.

The masses of the present discovery will harden at room temperature upon exposure to water for which the normal water content of the atmosphere is sufficient. In addition, or in its stead, water from another source, for instance, tap water, water vapor or water from crystal water containing compounds or some other hydroxyl-group-containing compound can be used. If desired, the hardening can also be carried out at higher temperatures to accelerate the rate of vulcanization.

The materials of the present discovery or the elastomers obtained thereby will adhere firmly to a wide variety of materials such as glass, porcelain, wood, metal, and organic and silicon organic synthetics. They are therefore very suitable for adhering organopolysiloxane elastomers obtained by other means to steel, as well as sealants, for example, in buildings, aircraft and motor vehicles. They are also suitable for all purposes in which room temperature vulcanizing organopolysiloxane elastomers are ordinarily incorporated, such as protective coatings, for electrical and thermal insulation, as impression materials in density, for coating textiles and for preparing foils, molds and laminates.

The following examples are included to aid those skilled in the art to better understand and practice this invention. The invention is not limited by the examples and is properly delineated in the claims. In the examples, all parts and percentages are based on weight unless otherwise specified and all viscosities are measured at 25° C.

Example 1

100 grams of organopolysiloxane of the formula

wherein $n$ has a value corresponding to a viscosity of 23,700 cs./25° C., were mixed with 50 g. quartz flour, 3 g. hexaethoxydisiloxane and 1 g. dibutyltindilaurate. The mixture was placed into tubes and remained there for over three months unchanged. In the air, an extrusion from the tube hardened to an elastomer within an hour.

Example 2

100 g. of a diorganosiloxane displaying n-butyryloxydimethylsiloxy units as terminal units composed of 7.5 mol percent phenylmethylsiloxane and 92.5 mol percent dimethylsiloxane units, 50,000 cs./25° C., were mixed with 15 g. fume silica and 15 g. quartz flour, 0.8 g. dibutyltindilaurate, 0.6 g. dibutylamine and 2.5 g. tetraethoxysilane [Si(OC$_2$H$_5$)$_4$]. The mixture remained unchanged for 3 months when kept in a closed air-tight screw thread container, but hardened to an elastomer in the air within three hours.

Example 3

100 g. of a dimethylpolysiloxane containing one Si bonded benzoyloxy group in each terminal unit, 35,000 cs./25° C., were mixed with 75 g. quartz flour, 5 g. titanium dioxide, 5 g. methyltrimethoxysilane and 1 g. lead octoate. The mixture remained unchanged for over three months in an air tight container but hardened to an elastomer within 20 hours in the air.

Example 4

100 g. of the dimethylpolysiloxane described in Example 1, containing one Si bonded acetoxy group in each terminal unit were mixed with 2 g. of the silane of the formula Si(OCH$_2$CH$_2$OCH$_3$)$_4$ and 0.2 g. glacial acetic acid. The mixture remained unchanged for over three months in closed tubes but hardened to an elastomer within three hours in the air.

Example 5

100 g. of dimethylpolysiloxane, 45,000 cs./25° C. containing one Si bonded acetoxy group in each terminal unit were mixed with 30 g. quartz flour, 15 g. of an esterified silica having a bulk weight of 0.32 g./cm.$^3$ and consisting of about 88 percent silicic acid and about 12 percent of esterified butoxy groups, and 5 g. dibutyltindilaurate. The mixture remained unchanged for over three months in an air tight can but hardened to an elastomer within 24 hours in the air.

Example 6

100 g. of a mixture of 50 weight percent of a dimethylpolysiloxane displaying one Si bonded hydroxyl group in each terminal unit, 20,000 cs./25° C., 25 weight percent diatomaceous earth and 25 percent quartz flour were first mixed with 1 ml. dimethyldiacetoxysilane and 24 hours later with 5 ml. of a mixture of 66 vol. percent hexaethoxydisiloxane and 34 vol. percent dibutyltindilaurate. The mixture remained stored in a tube for over 3 months and hardened to an elastomer in the air within 3 days in a 3 mm. layer.

Example 7

Equivalent results were achieved when the acetoxy endblocked dimethylsiloxane of Example 1 is replaced by any of the following:

C$_5$H$_{11}$COO[CF$_3$CH$_2$CH$_2$(CH$_3$)SiO]$_n$
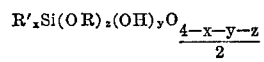
OCC$_5$H$_{11}$—100,000 cs.

CH$_3$CH$_2$CH$_2$CH(C$_2$H$_5$)CH$_2$COO[(CH$_3$)$_2$SiO]$_n$
[CH$_3$(CH$_2$=CH)SiO]$_n$
OOCCH$_2$(C$_2$H$_5$)CHCH$_2$CH$_2$CH$_3$—300,000 cs.

acetoxy endblocked copolymers of dimethylsiloxane units and cyanopropylmethylsiloxane units of 10,000 to 150,000 cs.

Example 8

Equivalent results were achieved when the methyltrimethoxysilane in Example 3 was replaced with an equivalent amount of each of the following: C$_2$H$_5$Si(OCH$_3$)$_3$, CH$_3$Si(OC$_2$H$_5$)$_3$, Si(OCH$_3$)$_4$, Si(OC$_4$H$_9$)$_4$, Si(OCH=CH$_2$)$_2$(OCH$_3$)$_2$ Si(OC$_2$H$_5$)$_2$(OC$_3$H$_7$)$_2$, methylpolysilicate, ethylpolysilicate, CH$_3$Si(OCH$_2$CH$_2$OCH=CH$_2$)$_3$, C$_6$H$_5$Si(OCH$_3$)$_3$, ClC$_6$H$_4$Si(OCH$_2$CH$_2$OCH$_3$)$_3$ and a siloxane copolymer of 20 mol percent (CH$_3$O)CH$_3$SiO units, 49 mol percent (CH$_3$)$_2$SiO units, 30 mole percent CH$_3$SiO$_{3/2}$ units and 1 mol percent C$_6$H$_5$(CH$_3$)SiO units.

Example 9

Equivalent results are achieved when Example 4 is repeated employing in place of the glacial acetic acid an equivalent amount of any of the following: sec-butylamine, diethylbenzylamine, isobutylamine, trimethylamine, trimethylenediamine, [NH$_2$(CH$_2$)$_3$(CH$_3$)$_2$Si]$_2$O, acrylic acid, (C$_2$H$_5$)$_3$NHOOCC$_7$H$_{15}$, diethylenetriaminemonooleate, ammonium stearate, benzyltrimethylammonium acetate, zinc naphthenate, iron-2-ethylhexoate, chromium octoate, dialkyltin diacylates, dibutyl tin dibenzoate and stannous octoate.

Example 10

A silicone elastomer equivalent to that obtained in Example 1 was achieved with a mixture of 100 parts of an acetoxy endblocked dimethylsiloxane polymer of 30,000 cs., 20 parts of fume silica and 5 parts ethylorthosilicate.

That which is claimed is:
1. A composition consisting essentially of 100 parts by weight of an essentially linear organosiloxane polymer having terminal units of the formula R″COOSi(R′)$_2$— wherein each R″ is a monovalent substituent selected from the group consisting of hydrogen atoms, hydrocarbon radicals and halogenohydrocarbon radicals, each R′ is a monovalent substituent selected from the group consisting of hydrocarbon radicals, halogenohydrocarbon radicals and cyanoalkyl radicals, the organic substituents in said polymer being monovalent substituents selected from hydrocarbon radicals, halogenohydrocarbon radicals and cyanoalkyl radicals, said polymers having a viscosity from 5,000 cs. to 5×10$^6$ cs. at 25° C., 0.5 to 15 parts by weight of an organosilicon compound selected from the group consisting of (1) organosiloxane polymers of the general unit formula $$R'_xSi(OR)_z(OH)_yO_{\frac{4-x-y-z}{2}}$$

where each R is a monovalent organic radical selected from hydrocarbon radicals, halogenohydrocarbon radicals and R‴(OCH$_2$CH$_2$)$_a$ where R‴ is a hydrocarbon radical or a halogenohydrocarbon radical and $a$ is 1, 2 or 3 and R′ is as above defined, $x$, $y$ and $z$ each have a value from 0 to 3 and $x+y+z$ does not exceed 3, the average value of $x$ is 1 to 1.7, each molecule contains at least 3 OR groups and the viscosity of the polymer at 25° C. does not exceed 120,000 cs., and (2) an esterified silica filler having —OR groups bonded to the silica surface, where R is as above defined and 0.01 to 10 parts by weight of a condensation catalyst.

References Cited

UNITED STATES PATENTS

| 2,982,755 | 5/1961 | Kidwell et al. | 260—33.6 |
| 3,035,016 | 5/1962 | Bruner | 260—448.2 |
| 3,077,465 | 2/1963 | Bruner | 260—448.2 |
| 3,105,061 | 9/1963 | Bruner | 260—18 |

OTHER REFERENCES

F. A. Henglein and P. Schmulder: Die Makromolekulare Chemie, vol. 13, September 1954. pp. 58–61 relied upon. Call No. QD281 P6ME copy available in Group 140.

K. A. Andrianov, N. N. Sokolov and E. N. Krustaleva: Journal of General Chemistry of the U.S.S.R., vol. 26, No. 4, April 1956 (in English translation), pp. 1249–1253 relied upon.

K. J. Brimley: Institution of the Rubber Industry, Proceedings, vol. 9, April 1962, pp. P35–P40 relied upon.

MORRIS LIEBMAN, *Primary Examiner.*

L. T. JACOBS, *Assistant Examiner.*

U.S. Cl. X.R.

260—825